Patented Dec. 28, 1926.

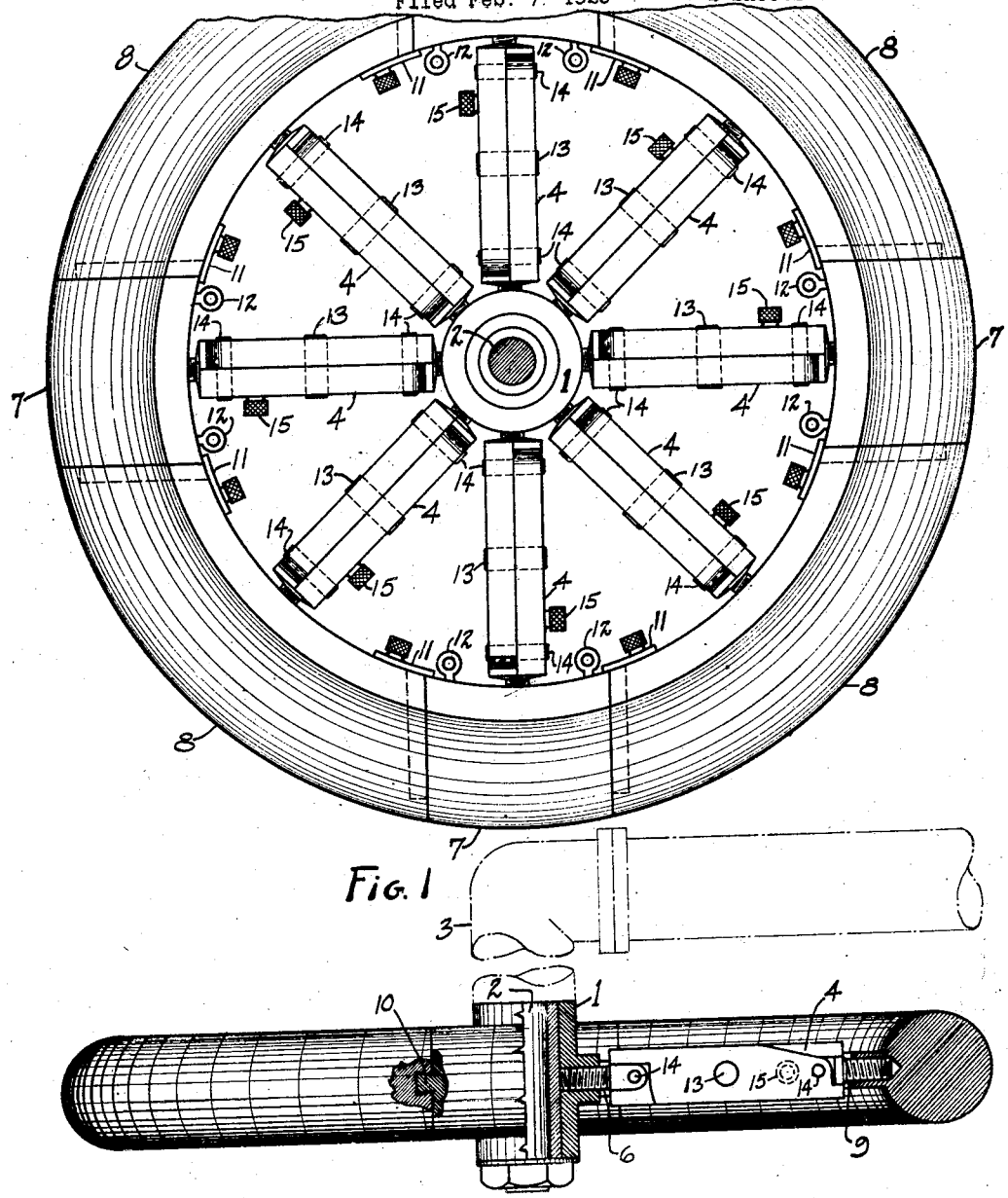

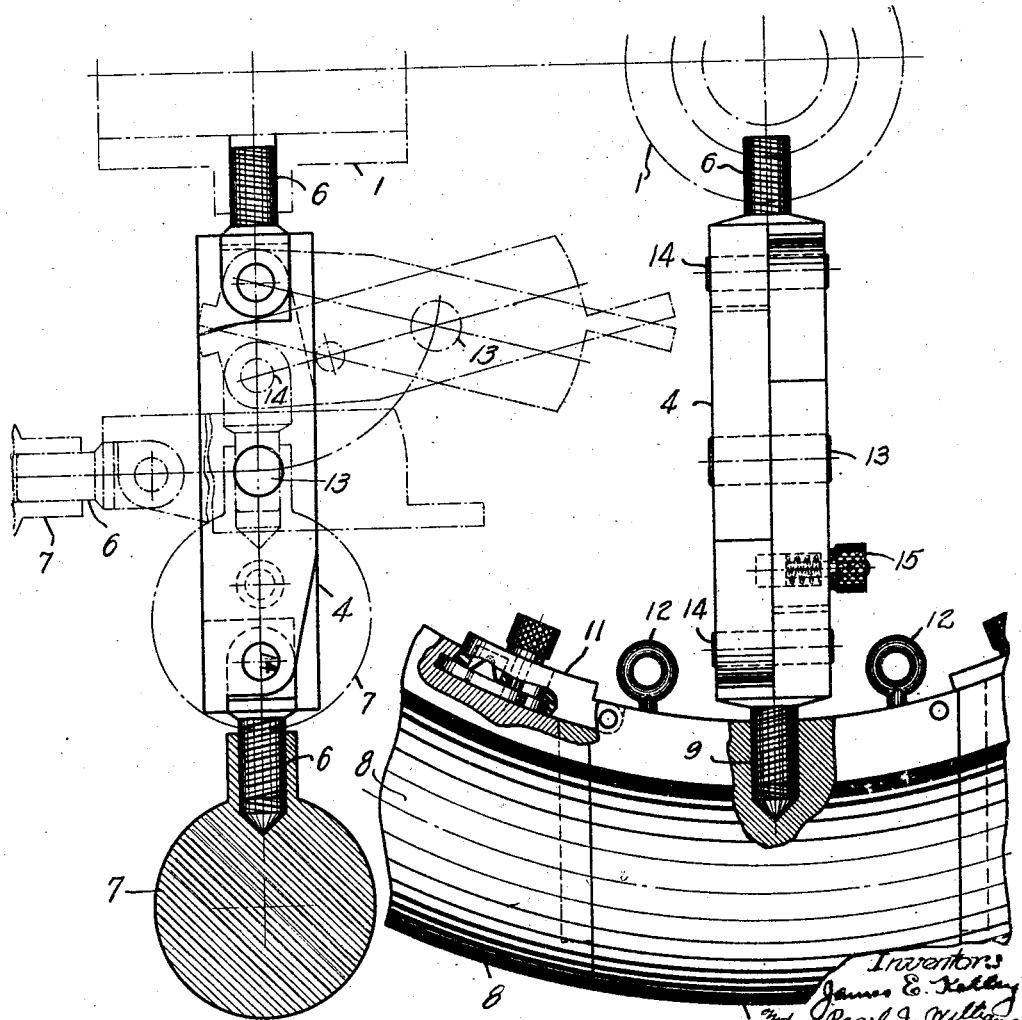

1,612,731

UNITED STATES PATENT OFFICE.

JAMES E. KELLEY AND PEARL J. WILLIAMS, OF SPRINGFIELD, OHIO.

TIRE-BUILDING CORE WHEEL.

Application filed February 7, 1925. Serial No. 7,701.

Our invention relates to improvements in tire building core-wheels in which the core is constructed of removable sections; it more particularly relating to the arrangement by which the core sections may be removed from the completed tire.

An object of our invention is to provide a tire building core-wheel of simple and effective construction by which the core may be readily removed from the completed tire.

A further object of the invention is to provide an arrangement by which the cross sections or segments may be readily and accurately adjusted with respect to each other and also with relation to the hub of the wheel.

A further object of the invention is to provide a core-wheel of the character described, the spokes of which are of a collapsible or folding character so that when the core section is withdrawn from the completed tire the spoke corresponding to that section will be collapsed by folding but at the same time be kept permanently connected with both the hub and the core section.

In the accompanying drawings:

Fig. 1 is a plan view of a tire building device embodying the improvements.

Fig. 2 is a side elevation partly in section of the same showing one of the spokes in rigid position.

Fig. 3 is a plan view partly in section of a portion of the same.

Fig. 4 is a detail sectional view of Fig. 3 showing in dotted lines the positions assumed by the spoke in withdrawing the core section.

Referring to the drawings, 1 represents the hub of the wheel which is mounted to rotate on a spindle 2 which is supported by a goose neck 3. Attached to the hub is a series of radial spokes each of which is attached at its outer end to a section of the core, these sections being represented by the reference characters 7 and 8. Each spoke is formed of two members pivotally connected together at their centers by pins 13. One member of each spoke is connected with the hub by a threaded stud 6 while the other member is connected with its corresponding core section by a threaded stud 9. These studs are oppositely threaded so as to give the spoke the properties of a turn buckle whereby by rotating the spoke the core section may be accurately adjusted with relation to adjacent core sections and also with relation to the hub. The studs 6 and 7 are connected with their corresponding spoke members by pivot pins 14; each stud being provided with a square head which receives its corresponding pin and is embraced on one side by an extension projecting from the companion spoke member so that when the two members of the spoke are locked together by the locking pin 15 rotation about the pins 14 will be prevented. The locking pin 15 is carried by one of the spoke members with its inner end adapted to engage in a recess in the companion spoke member and normally impelled to locking position by a coil spring as shown.

Each of the core segments has its ends provided with tenons which are received by corresponding slots in the adjacent core segments 8 as indicated at 10 in Fig. 2 and there is preferably provided a lock 11 between adjacent core sections for locking the segments in position. The sections 7 are the key sections of the core and the ends of each of these key sections are in parallel relation.

The operation of removing the core from the complete tire is as follows: The core-wheel is placed in a horizontal position. With tires of small or medium size the locks 11 are released between all of the segments, excepting preferably three adjacent sections such, for instance, as the ones at the right hand of Fig. 1. Any suitable withdrawing device is then connected to the eyes 12 of one of the key sections 7 and the spoke member corresponding to that section disconnected by withdrawing the locking pin 15. That section 7 is then pulled inwardly out of the tire, the members of the spoke of that section completing or folding to a position shown in dotted lines at the left of Fig. 4 in which it will be seen that the free ends of each spoke member swings to one side of the plane of the spoke when in rigid position as the ends which carry the studs approach each other, and as soon as the segment 7 clears the two adjacent spokes it falls from the withdrawing device. The withdrawing device may then be connected with one of the other key sections 7 and the operation repeated. The three sections 7 are first withdrawn and thereafter two of the sections 8, such for instance as the two sections at the left hand side of the core shown in Fig. 1, the tire building forced from the remainder of the core sections which are preferably kept rigid and locked.

It has been stated that three of the sections are preferably maintained in rigid position and the tire forced therefrom after the other sections have been withdrawn. In the larger sized tires, however, it is found desirable to withdraw all of the sections by the withdrawing device in the manner described.

Having thus described our invention, we claim:

1. In a tire building device, the combination of a hub, a series of core sections to form an annular core when assembled, a plurality at least of said sections being movable relatively to said hub, a series of radial spokes for connecting said core sections and hub, the spoke for each of said movable core sections being constructed to fold upon the withdrawal of its corresponding section, said spoke when folded projecting laterally with relation to the plane of the unfolded spokes, together with means for holding said spoke in rigid position.

2. In a tire building device, the combination of a hub, a series of core sections to form an annular core when assembled, a plurality at least of each of said sections being movable relatively to said hub, a series of radial spokes for connecting said core sections and hub, the spoke for each of said movable core sections being formed of two members pivoted together and connected respectively to the hub and corresponding core section to permit said spoke to fold when the core section is withdrawn, said spoke when folded projecting laterally with relation to the plane of the unfolded spokes and means for rigidly and detachably connecting said members together.

3. In a tire building device, the combination of a hub, a series of core sections to form an annular core when assembled, a plurality at least of which are movable relatively to said hub, a series of radial spokes for connecting said core sections and hub, the spoke for each of said movable sections being formed of two members pivoted together, means for pivotally connecting the members of said spoke respectively with said hub and the corresponding core section, the pivotal connection between the members of said spoke being at right angles to the axis of the hub so that said spoke will fold laterally with relation to the plane of the unfolded spokes, and means for rigidly locking said spoke members together.

4. In a tire building device, the combination of a hub, a series of core sections to form an annular core when assembled, a plurality at least of which are movable relatively to said hub, a series of radial spokes for connecting said core sections and hub, the spoke for each of said movable sections being formed of two members pivoted together, and a stud pivotally connected with each of said spoke members at opposite ends of the spoke, said studs having threaded connections respectively with the hub and corresponding hub section, means for securing said spoke members together, and means for holding said studs rigid with said spoke members when the spoke members are locked together.

5. In a tire building device, the combination of a hub, a series of core sections to form an annular core when assembled, a plurality at least of which are movable relatively to said hub, a series of radial spokes for connecting said core sections and hub, the spoke for each of said movable sections being formed of two members pivoted together, a stud pivotally connected with each of said spoke members at opposite ends of said spoke, and means for detachably locking said spoke members together, each of said spoke members having an extension member, the stud on the opposite member cooperating with said extension to hold said studs rigid with the spoke when said spoke members are locked together.

6. In a tire building device, the combination of a hub, a series of core sections to form an annular core when assembled, a plurality at least of which are movable relatively to said hub, a series of foldable spokes extending radially from the hub for connecting said core sections and hub together, with means for locking said spokes in rigid position, each of said spokes being foldable in a direction laterally to the plane of the unfolded spokes, and a threaded stud at each end of each spoke adapted to be threaded respectively in said hub and the corresponding core section, one of said studs being provided with right hand threads and the other with left hand threads to permit the core sections to be adjusted relatively to adjacent core sections by turning the spoke.

JAMES E. KELLEY.
PEARL J. WILLIAMS.